(12) United States Patent
Tokhtuev et al.

(10) Patent No.: US 9,383,235 B2
(45) Date of Patent: Jul. 5, 2016

(54) FLUID FLOW METER

(71) Applicant: Ecolab USA Inc., St. Paul, MN (US)

(72) Inventors: Eugene Tokhtuev, Duluth, MN (US); Anatoly Skirda, Hermantown, MN (US); Christopher J. Owen, Duluth, MN (US); William M. Christensen, Hibbing, MN (US); Paul S. Schilling, Duluth, MN (US)

(73) Assignee: Ecolab USA Inc., St. Paul, MN (US)

( * ) Notice: Subject to any disclaimer, the term of this patent is extended or adjusted under 35 U.S.C. 154(b) by 0 days.

(21) Appl. No.: 14/576,532

(22) Filed: Dec. 19, 2014

(65) Prior Publication Data
US 2015/0168186 A1   Jun. 18, 2015

Related U.S. Application Data

(63) Continuation of application No. 13/833,582, filed on Mar. 15, 2013, now Pat. No. 8,943,901.

(51) Int. Cl.
*G01F 15/00* (2006.01)
*G01F 1/06* (2006.01)
*G01F 1/72* (2006.01)
*G01F 3/10* (2006.01)

(52) U.S. Cl.
CPC .. *G01F 1/06* (2013.01); *G01F 1/72* (2013.01); *G01F 3/10* (2013.01)

(58) Field of Classification Search
CPC ............ G01F 15/00; G01F 15/06; G01F 3/04
USPC .................................. 73/861.77, 861.78, 261
See application file for complete search history.

(56) References Cited

U.S. PATENT DOCUMENTS 4,224,015 A * 9/1980 Nagata ...................... G01F 3/10
                                                               418/150
5,895,847 A * 4/1999 Steuer ................... G01D 5/2013
                                                               417/418

(Continued)

FOREIGN PATENT DOCUMENTS

| EP | 1079207 A2 | 2/2001 |
| EP | 2051071 A1 | 4/2009 |
| WO | 2007132062 A1 | 11/2007 |

OTHER PUBLICATIONS

International Search Report and Written Opinion for International Application No. PCT/US2014/027641, mailed Sep. 9, 2014, 10 pages.

*Primary Examiner* — Jewel V Thompson
(74) *Attorney, Agent, or Firm* — Fredrikson & Byron, P.A.

(57) ABSTRACT

Systems and methods for determining a flow rate or volume of fluid. The system includes a positive displacement meter including a plurality of non-contact sensors and gears configured to rotate in response to fluid flow through the meter. The gears may include detectable areas that may be sensed by the plurality of non-contact sensors to determine a rotational direction of the gears. The plurality of non-contact sensors may also be configured to generate respective detection signals indicative of a rotation state of the gears. The controller may be configured to receive the detection signals, determine a current rotation state, and increment a rotational count based on the changes in the current rotation state. The controller may use the rotational count to determine a flow rate or volume of fluid.

20 Claims, 11 Drawing Sheets

(56) References Cited

U.S. PATENT DOCUMENTS

| | | | | |
|---|---|---|---|---|
| 5,970,791 A * | 10/1999 | Barczynski | | F01C 1/123 417/540 |
| 5,992,230 A * | 11/1999 | Scarpa | | F04C 2/126 418/206.5 |
| 5,996,405 A * | 12/1999 | Bergervoet | | G01F 3/10 73/202 |
| 6,644,947 B2 * | 11/2003 | Cavanaugh | | F01C 1/084 418/150 |
| 7,523,660 B2 * | 4/2009 | Albrecht | | G01F 3/10 73/261 |
| 8,069,719 B2 | 12/2011 | Tokhtuev et al. | | |
| 8,166,828 B2 | 5/2012 | Skirda et al. | | |
| 8,943,901 B2 * | 2/2015 | Tokhtuev | | G01F 1/06 73/861.77 |
| 2010/0199758 A1 * | 8/2010 | Tokhtuev | | G01F 3/10 73/261 |
| 2011/0110179 A1 | 5/2011 | Richards et al. | | |
| 2012/0024080 A1 * | 2/2012 | Carbone, II | | G01F 3/10 73/861.04 |

* cited by examiner

FIG. 5A
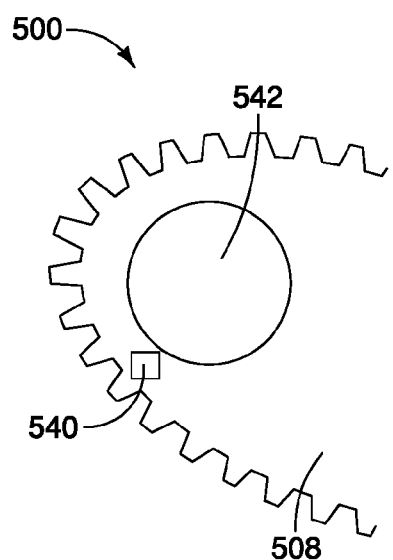
FIG. 5B
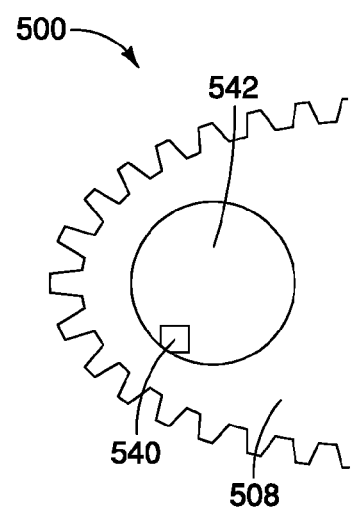
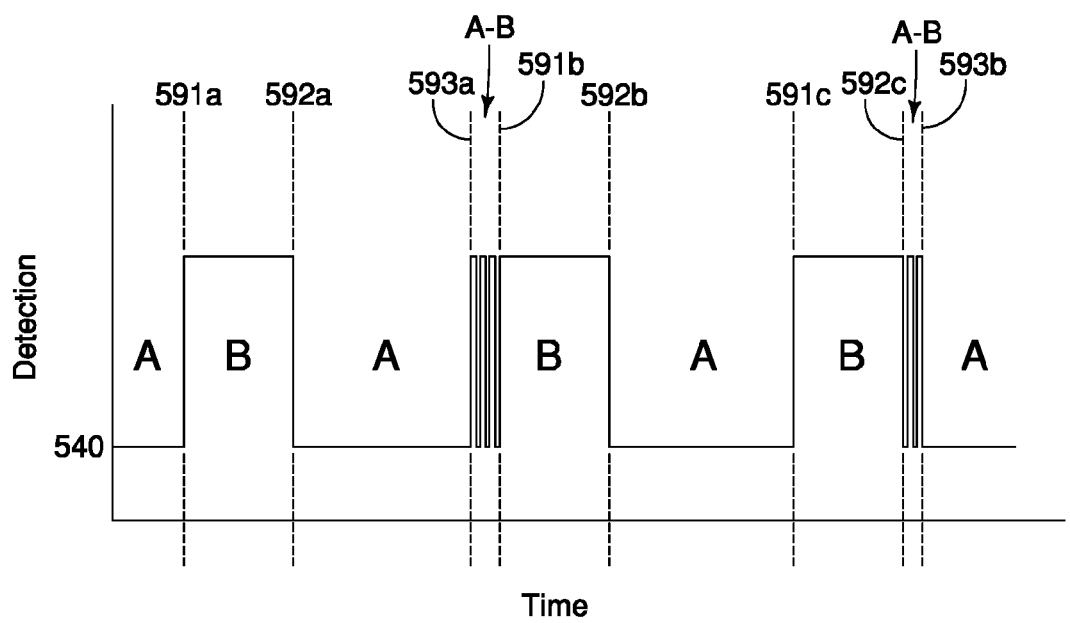
FIG. 5C

FIG. 6A
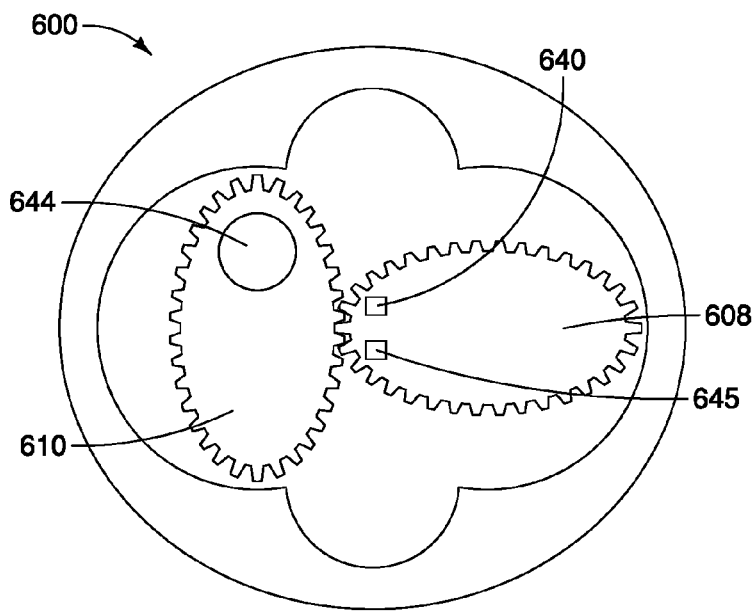
FIG. 6B
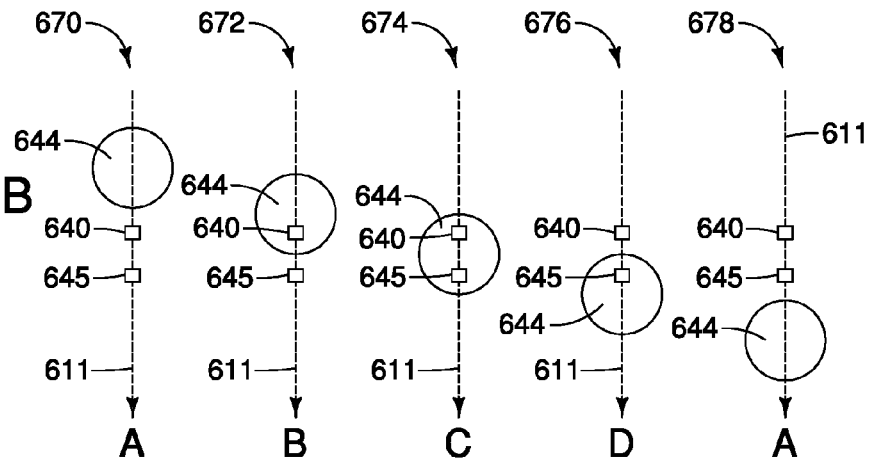
FIG. 6C
| Rotation State | Rotational Position | Sensor 640 | Sensor 645 |
|---|---|---|---|
| A | 670, 678 | 0 | 0 |
| B | 672 | 1 | 0 |
| C | 674 | 1 | 1 |
| D | 676 | 0 | 1 |

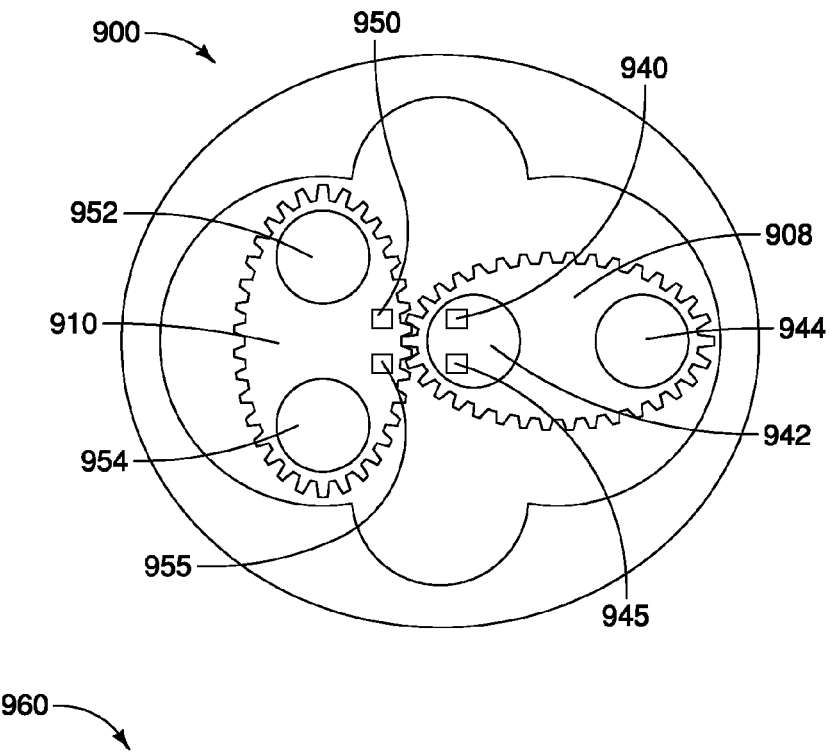

FLUID FLOW METER

CROSS REFERENCE TO RELATED APPLICATION

This application is a continuation of U.S. patent application Ser. No. 13/833, 582, filed Mar. 15, 2013 and titled "FLUID FLOW METER." The entire contents of which is incorporated herein by reference.

FIELD

This disclosure relates to a positive displacement fluid flow meter, more particularly, to the use of a gear flow meter incorporating non-contact sensors and methods of use of such devices.

BACKGROUND

Positive displacement fluid measurement systems may be used to measure a flow rate or volume of a fluid or gas. For example, dispensing systems may use feedback from a positive displacement fluid meter to control the volume of fluid dispensed. Such control systems are often used in lieu of time-on controls to more accurately dispense precise amounts of fluid or gas and is commonly used in a variety of settings including, but not limited to, the industrial, healthcare, pharmaceutical and food and beverage industries. For example, a positive displacement fluid meter may be used in the manufacturing process of a drug which requires accurate measurement of two materials to be mixed into a single batch. The positive displacement fluid meter may be installed in the supply lines of the respective materials and feedback from the meters may be used to dispense the appropriate amount of each material into a blend tank to be mixed. This application of a positive displacement meter, like many others, may require the positive displacement meter to have an accuracy of measurement (e.g., +/−0.5%) to comply with quality control or regulations, for example. Accordingly, ensuring that a positive displacement meter accurately measures a volume of fluid or gas can help ensure that a system or process performs its intended function.

SUMMARY

According to one aspect of the invention, a system includes a flow meter, a first and second non-contact sensor and a controller. The flow meter includes a housing that defines a chamber having a fluid inlet and a fluid outlet and having a first gear and a second gear installed within the chamber. The first gear is configured to intermesh with the second gear so that the first gear and the second gear rotate together in response to fluid flow through the chamber. At least one of the first gear and the second gear includes a detectable area for detecting a rotational position of the first gear and the second gear. The first non-contact sensor is configured to generate a first sensor signal and sense the detectable area when the first gear and second gear are in a first range of rotational positions. The first sensor signal is indicative of a position of the detectable area relative to the first non-contact sensor. The second non-contact sensor is configured to generate a second sensor signal and sense the detectable area when the first gear and second gear are in a second range of rotational positions different from the first range of rotational positions. The second sensor signal is indicative of a position of the detectable area relative to the second non-contact sensor. The controller is operatively connected to the first non-contact sensor and the second non-contact sensor and configured to receive the first sensor signal and the second sensor signal. The controller is also configured to determine which rotation state from a plurality of rotation states the sensor signals currently correspond to and define that rotation state as the current rotation state based on the first sensor signal and the second sensor signal. The plurality of rotation states have a predefined sequential order, is defined as a sequence of rotation states, and corresponds to a sequence of rotational positions of the first and second gears in response to fluid flow through the chamber. The controller is also configured to increment a rotational count indicative of a number of rotations of the first and second gears when the current rotation state changes, in order, through the sequence of rotation states.

According to another aspect of the invention, a method for measuring fluid flow volume including receiving a first and second sensor signal, determining a current rotation state and incrementing a rotational count. Receiving a first sensor signal of a first non-contact sensor, the first non-contact sensor being configured to generate the first sensor signal and to sense a detectable area. Receiving a second sensor signal of a second non-contact sensor, the second non-contact sensor being configured to generate the second sensor signal and to sense the detectable area. Determining which rotation state from a plurality of rotation states the sensor signals currently correspond to and defining such rotation state as the current rotation state, the plurality of rotation state having a predefined sequential order, defined as a sequence of rotation states, and corresponding to a sequence of rotational positions of a first and second gears in response to fluid flow through a flow meter. Incrementing a rotational count indicative of a number of rotations of the first and second gears when the current rotation state changes, in order, through the sequence of rotation states.

In accordance with another aspect of the invention, a flow meter for measuring fluid volume including a housing defining a chamber having a fluid inlet and fluid outlet and a first gear and a second gear installed within the chamber. The first gear intermeshes with the second gear so that the first gear and the second gear rotates in response to fluid flow through the meter. The first gear including teeth at each end of a major axis of the first gear that are equidistant from a center of the first gear. The second gear including teeth at each end of a major axis of the second gear that are equidistant from a center of the second gear.

The details of one or more examples are set forth in the accompanying drawings and the description below. Other features, objects, and advantages will be apparent from the description and drawings, and from the claims.

BRIEF DESCRIPTION OF DRAWINGS

The following drawings are illustrative of particular examples of the present invention and therefore do not limit the scope of the invention. The drawings are not to scale (unless so stated) and are intended for use in conjunction with the explanations in the following detailed description. Examples of the present invention will hereinafter be described in conjunction with the appended drawings, wherein like numerals denote like elements.

FIGS. 5A and 5B are partial top views of rotational positions of an oval gear meter.

FIG. 5C is a plot of a detection signal of a non-contact sensor of the oval gear meter of FIGS. 5A and 5B over time.

FIG. 6A is a top plan view of an oval gear meter configured to sense a rotational direction of oval gears of the meter.

FIG. 6B provides partial top views of rotational positions of the oval gear meter of FIG. 6A.

FIG. 6C is a table showing the rotation states of the oval gear meter of FIG. 6A.

FIG. 9A is a top plan view of an oval gear meter including four detectable areas and four non-contact sensors.

FIG. 9B is a table showing the rotation states of the oval gear meter of FIG. 9A.

DETAILED DESCRIPTION

Figure 1:
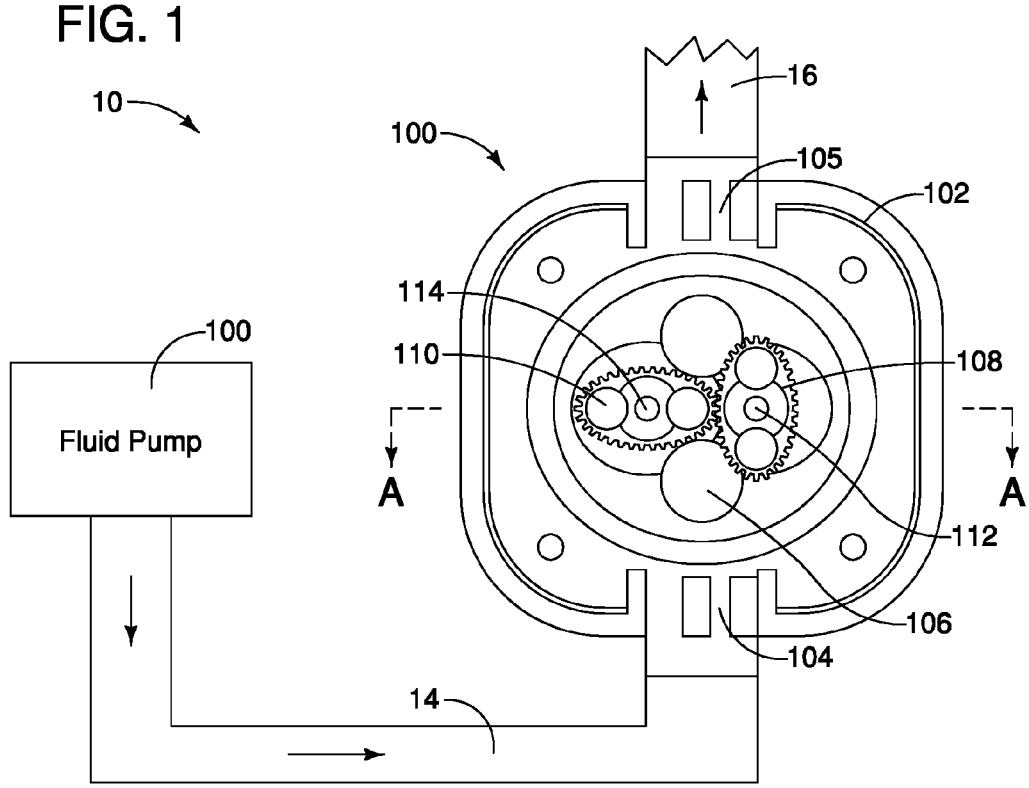
FIG. 1 is a top plan view of a fluid flow measurement system including an oval gear meter.

The following detailed description is exemplary in nature and is not intended to limit the scope, applicability, or configuration of the invention in any way. Rather, the following description provides some practical illustrations for implementing examples of the present invention. Examples of constructions, materials, dimensions, and manufacturing processes are provided for selected elements, and all other elements employ that which is known to those of ordinary skill in the field of the invention. Those skilled in the art will recognize that many of the noted examples have a variety of suitable alternatives.

Positive displacement fluid meters are used in a variety of applications to measure flow rate or volume of a fluid. For example, in the pharmaceutical industry, positive displacement meters may be used to precisely measure amounts of materials required to manufacture a drug. This application of a positive displacement meter, like many others applications, may require the positive displacement meter to have an accuracy of measurement (e.g., +/−0.5%) to comply with quality control or regulations, for example. Furthermore, positive displacement fluid meters may be used in applications with varying flow characteristics, e.g., high/low flow rates and uniform/non-uniform fluid flow. Accordingly, ensuring that a positive displacement meter accurately measures a volume of fluid, notwithstanding the flow characteristics of the application, may help ensure that the system or process performs its intended function.

Positive displacement fluid meters generally require mechanical displacement of components of the meter in order to measure flow. Gear meters, in particular oval gear meters, are an example of a positive displacement fluid meter wherein gears of the meter are displaced to measure fluid flow. An oval gear meter provides a pair of intermeshing oval gears positioned within an oval gear chamber such that the gears rotate in concert. A fluid may be measured by introducing the fluid into the chamber through a fluid inlet to cause the gears to rotate. The intermeshing of the gears prevent the fluid from passing between the gears themselves causing the fluid to pass around the gears within pockets defined between the oval gears and the chamber wall. In an oval gear, the volumes of the pockets are precisely measured so the volume of fluid exiting the chamber during each rotation is known. Thus, the volume of fluid flow through an oval gear meter may be measured by measuring the number of rotations of the gears. Likewise, flow rate may be determined from the speed with which the gears rotate.

Non-contact sensors may be included in an oval gear to measure gear rotation. Generally, a non-contact sensor may be configured to sense a detectable area located on at least one of the gears and may be located external of the chamber in a position to sense the detectable area as the gears rotate. The non-contact sensor may also be configured to generate a detection signal based on whether the detectable area is sensed. A controller may be included in an oval gear to receive the detection signal from the non-contact sensors and generate a rotational count. The controller may include a programmable processor and/or memory. The controller may be further configured to calculate a volume of fluid flow through the oval gear based on the rotational count.

Generally, oval gear meters including non-contact sensors tend to accurately measure fluid flow in applications having a high fluid flow rate or a relatively uniform fluid flow (e.g., fluid provided by peristaltic pumps or from pressure-maintained fluid lines). In applications having low fluid flow rates or where the fluid flow is non-uniform, however, oval gear meters including non-contact sensors may have a lower accuracy of measurement. For example, non-uniform flow generated by a diaphragm pump may cause pressure shocks which generate fluid oscillations in the fluid lines after each pump cycle. The fluid oscillations may produce vibrations, or "jitter," of the oval gears, or a backflow of fluid through the meter. When jitter occurs near the sensing region of a non-contact sensor, the jitter may induce false detection signals from the sensor which may cause a controller to generate an inaccurate rotational count. False detection signals may also be induced by backflow of fluid into an oval gear meter. For example, a pressure shock in a fluid line may cause fluid to flow into the fluid outlet of an oval gear meter causing oval gears of the meter to rotate in a backwards direction. Backflow occurring when the oval gears are near a sensing region of the non-contact sensor may induce the controller to generate an inaccurate rotational count. Additionally, oval gear meters in low flow applications may also have increased error due to leakage of fluid around the oval gears.

This disclosure describes a positive displacement fluid meter, in particular a gear meter, for determining a flow rate or volume of fluid. In particular, this disclosure described methods, systems, and apparatuses related to gear meters that may be used in applications with non-uniform and/or low flow characteristics.

FIG. 1 is a top plan view of a fluid flow measurement system 10 including an oval gear meter 100. System 10 includes a fluid pump 12, a first fluid line 14, a second fluid line 16 and an oval gear 100. First fluid line 14 may be in fluid communication with fluid pump 12 configured to provide a fluid flow through system 10. Fluid pump 12 may be in fluid communication with a fluid source (not shown) and may any suitable pump to provide a fluid flow through the system. The fluid flow may have a variety of fluid flow characteristics and may depend on the type of pump selected or the application of system 10. For example, different applications may require either a high fluid flow volume or a low fluid flow volume. Certain examples may require uniform fluid flow provided by a peristaltic pump or pressure-maintained fluid lines. In other examples, a fluid pump may provide non-uniform fluid flow particularly where the application requires a low fluid volume.

Oval gear meter 100 may be configured to measure fluid flow through system 10 and may include a housing 102 defining a chamber 106, a fluid inlet 104 and a fluid outlet 105. Fluid inlet 104 may be in fluid communication with first fluid line 14 and provides fluid flow from the first fluid line into chamber 106. Oval gears 108 and 110 are installed within chamber 106 and are configured to rotate in concert about fixed axes of rotation 112 and 114, respectively, in response to fluid flow through the chamber. Fluid exits chamber 106 by way of fluid outlet 105 which is in fluid communication with second fluid line 16.

Accordingly, fluid provided by fluid pump 12 flows through fluid line 14 and into oval gear meter through fluid inlet 104. The fluid then flows through oval gear meter 100, wherein the volume of flow is measured, and out oval gear meter 100 through fluid outlet 105 and into second fluid line 16.

Figure 2:
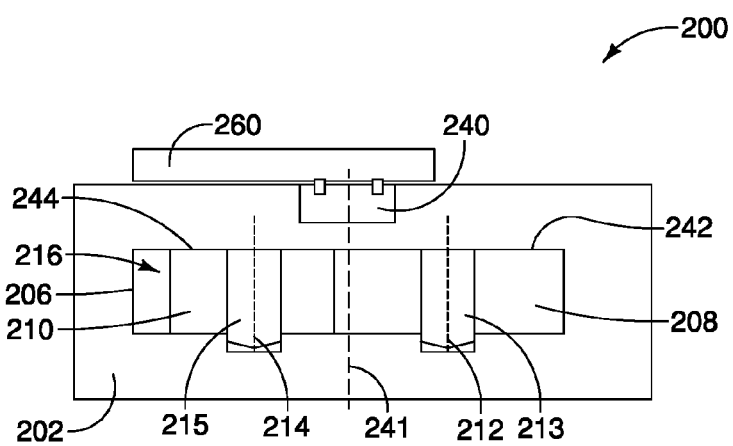
FIG. 2 is a cross-sectional side view of an oval gear meter taken along line A-A of FIG. 1.

FIG. 2 is a cross-sectional side view of an oval gear meter 200 that may be taken along line A-A of the oval gear 100 of FIG. 1. Oval gear meter 200 includes a housing 202, oval gears 208 and 210, a non-contact sensor 240 and a controller 260. Oval gears 208 and 210 are installed within a chamber 206 defined by housing 202 and may be configured to rotate about axles 213 and 215, respectively. Housing 202 and oval gears 208 and 210 may comprise any suitable material compatible with the fluid being metered, for example a moldable plastic.

In certain embodiments, oval gear meter 200 may also include non-contact sensor 240 and controller 260. Non-contact sensor 240 may be configured to sense a detectable area (not shown) provided on top surfaces 242 and 244 of oval gears 208 and 210, respectively. For example, non-contact sensor 240 may be a magnetic sensor configured to sense a detectable area comprising a magnet installed on or within at least one of the oval gears. In another example, non-contact sensor 240 may be an optical sensor configured to emit a wavelength onto at least one top surface 242 or 244 of the oval gears including a detectable area and sense a reflectance of the wavelength off at least one of the top surfaces. U.S. Pat. No. 7,523,660, filed Dec. 19, 2007, and U.S. Pat. No. 8,069,719, filed Feb. 11, 2009, provides examples of oval gears incorporating non-contact sensors, the entire disclosure of each is hereby incorporated herein by reference. It can be appreciated that oval gear meter 200 may include any number of non-contact sensors and any number of detectable areas suitable for a particular application of the meter. Non-contact sensor 240 may also be configured to generate a detection signal based on the detection, or lack of detection, of a detectable area.

Oval gear meter 200 may also include controller 260 configured to calculate a volume of fluid flow through the meter based on the detection signal of non-contact sensor 240. The controller may be configured to receive a detection signal of non-contact sensor 240 and determine a rotational count of the oval gears based on the detection signal. The rotational count may be indicative of the number of rotations made by oval gears 208 and 210 in response to fluid flow through chamber 206. As will be discussed further herein, a volume of fluid passing through an oval gear meter may be calculated when the number of rotations (complete and partially complete) made by the oval gears is known and a volume of fluid per rotation is known. Accordingly, controller 260 may be able to measure a volume of fluid passing through the meter by measuring a rotational count of the oval gears.

Figure 3A:
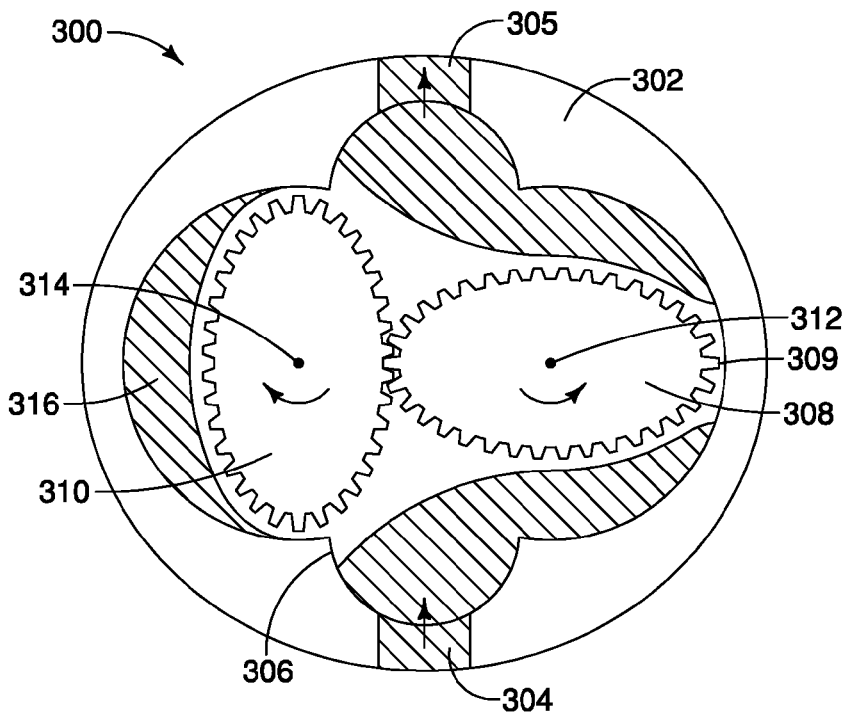
FIGS. 3A and 3B are top plan views illustrating fluid flow through an oval gear meter.
Figure 3B:
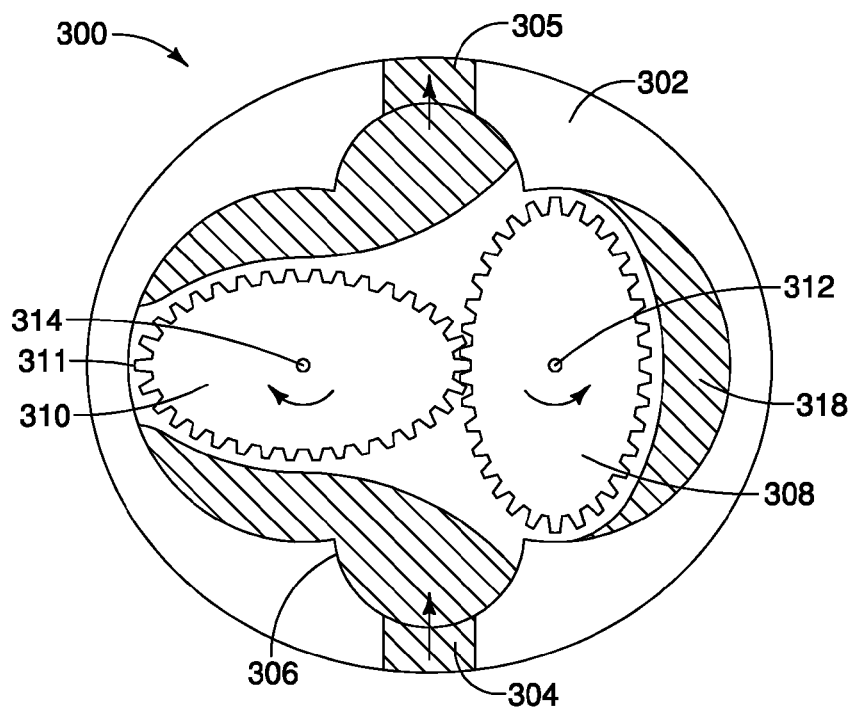

FIGS. 3A and 3B are top plan views illustrating fluid flow through an oval gear meter 300. Oval gear meter 300 includes a housing 302 defining a chamber 306 having fluid inlet 304 and fluid outlet 305. Oval gears 308 and 310 are installed within chamber 306 and are configured to rotate in concert about axes of rotation 312 and 314, respectively, in response to fluid flow through the chamber. Oval gears 308 and 310 are configured to intermesh thereby preventing fluid from fluid inlet 304 to pass between the gears. Accordingly fluid flows around the oval gears by way of fluid pockets 316 and 318.

FIG. 3A shows oval gear meter 300 in a first rotational position where in fluid may be introduced into chamber 306 through fluid inlet 304. As noted above, the intermeshing of oval gears 308 and 310 prevent fluid from passing in between the gears thereby forcing the incoming fluid towards a vertex 309 of oval gear 308 and urging oval gear 308 to rotate in a counter-clockwise direction. The counter-clockwise torque applied across oval gear 308 in turn urges the clockwise rotation of oval gear 310. FIG. 3B shows oval gear meter 300 in a radially advanced rotational position relative to the rotational position shown in FIG. 3A, wherein oval gear 308 has rotated 90 degrees counter-clockwise and oval gear 310 has rotated 90 degrees clockwise. In this rotational position of oval gear meter 300, the rotation of oval gear 308 has formed fluid pocket 318 defined by the surface of oval gear 308 and a wall of chamber 306. Concurrently, fluid from fluid inlet 304 is forced toward a vertex 311 of oval gear 310 thereby urging oval gear 310 to rotate in a clockwise direction. This in turn urges oval gear 308 to continue rotation in a counter-clockwise direction to release the fluid in fluid pocket 318. It can be appreciated that a similar fluid pocket 316 may be formed between oval gear 310 and a wall of chamber 306, as shown in FIG. 3A.

In this example, the volume of fluid flowing through oval gear meter 300 in one full rotation of oval gears 308 and 310 is equivalent to the volume of fluid contained by four fluid pockets. More specifically, one full rotation of the gears causes fluid pockets 316 and 318 to each be released twice. Generally, the volume of the fluid pockets of an oval gear are precisely measured, therefore a volume of fluid flow through the oval gear meter may be calculated by determining a rotational count of the oval gears of the meter. For example, a rotational count may be determined by a controller of oval gear meter 300 that indicates that two full rotations of oval gears 308 and 310 have occurred. Based on this rotational count, it is known that eight fluid pockets have been dispensed by the oval gear meter (e.g., four of fluid pocket 316 and four of fluid pocket 318) and thus a volume of fluid may be calculated if the volume of the fluid pockets are known.

As will be discussed further herein, a rotational count need not correspond with a full or complete rotation of the oval gears of an oval gear meter. In some examples, each rotational count may correspond with a known, partial rotation of the oval gears. In other examples, each rotational count may correspond with a full rotation, but the rotational count may be fractionally incremented by a known, fractional amount. Furthermore, oval gear meters may be configured to increase the resolution of measurement thereby allowing a more precise measurement of fluid flow through the meter. These configurations may be useful in low fluid flow applications. In one example, an oval gear meter may be configured measure half rotations of the oval gears which correspond to a volume equal to the volume of two fluid pockets. In another example, an oval gear meter may be configured to measure quarter rotations of the oval gears which correspond to a volume equal to one fluid pocket. The resolution of measurement of an oval gear meter may also depend on the volume of fluid pockets of the meter. Generally, fluid pockets with a smaller volume may increase the measurement resolution of an oval gear as smaller volumes of fluid are dispensed per rotation of the oval gears. Conversely, larger fluid pockets may decrease the resolution as larger volumes of fluid are dispensed per rotation. It can be appreciated that different applications may require a different measurement resolution and examples of the present application may be configured to have a wide range of resolutions.

Figure 4A:
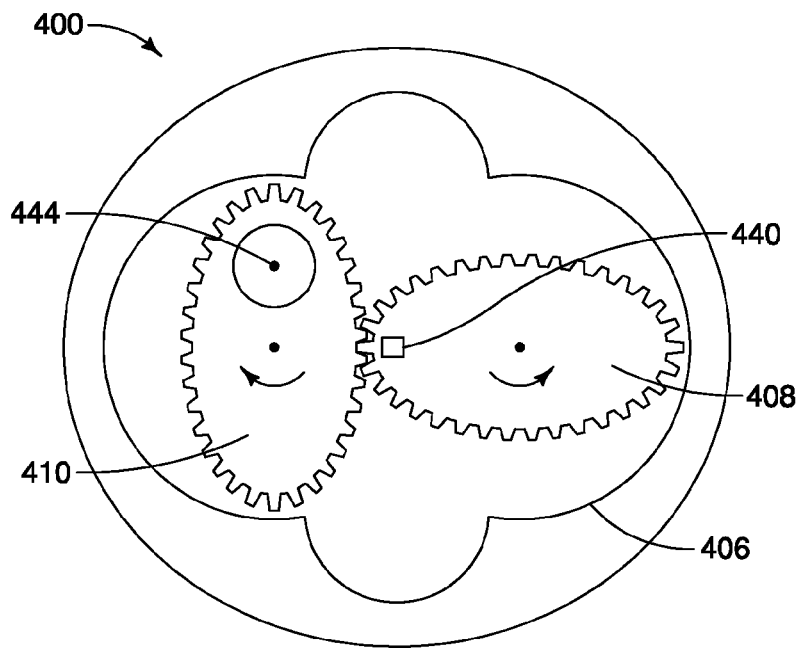
FIG. 4A is a top plan view of an oval gear meter including a non-contact sensor and a detectable area.

FIG. 4A is a top plan view of an oval gear meter 400 including a non-contact sensor 440 and a detectable area 444. Non-contact sensor 440 may be configured to sense detectable area 444 provided on a surface of oval gear 410 and generate a detection signal. Non-contact sensor 440 may be mounted in a housing (not shown) of oval gear meter 400 positioned above the top surfaces 242, 244 of oval gears 408 and 410. As indicated in FIG. 4A oval gear meters 408 and 410 are configured to rotate counter-clockwise and clockwise, respectively, in response to fluid flow through chamber 406. The rotation of oval gear 410 causes detectable area 444 to pass through a sensing region of non-contact sensor 440 that may be located underneath the sensor. Upon sensing detectable area 444, non-contact sensor may generate a detection signal. Thus, a detection signal of non-contact sensor 440 may be indicative of a rotational position of oval gears 408 and 410 wherein detectable area 444 is underneath non-contact sensor 440. In this example, non-contact sensor may be configured to generate a "positive" signal (hereinafter also referred to as "1" or "high") when the sensor senses the detectable area and a "negative" signal (hereinafter also referred to as "0" or "low") when the sensor does not sense the detectable area. It can be appreciated that the detection signal generated by a non-contact sensor may be of any form in any format suitable for indicating a sensing of a detectable area. In certain examples, a non-contact sensor may be configured to not generate a detection signal when a detectable area is not sensed. In such an example, the lack of a signal may still be indicative of a rotational position wherein the detectable area is not within a sensing region of the sensor.

Oval gear meter 400 may also include a controller configured to calculate a rotational count based on the detection signal provided by non-contact sensor 440. In this example, oval gear meter 400 is configured such that one full rotation of oval gears 408 and 410 causes non-contact sensor 440 to sense detectable area 444 only once. Thus, a rotational count may be determined based on the number of times a detectable area is sensed by the non-contact sensor.

Figure 4B:
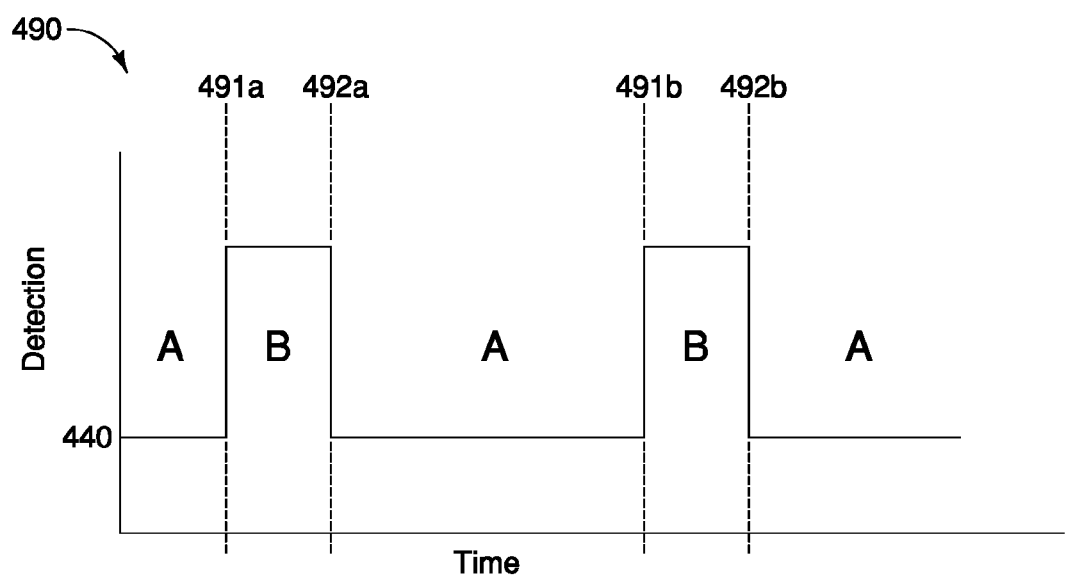
FIG. 4B is a plot of a detection signal of a non-contact sensor of the oval gear meter of FIG. 4A over time.

FIG. 4B is a plot 490 of a detection signal of non-contact sensor 440 of oval gear meter 400 over time. More specifically, plot 490 shows the detection signal of non-contact sensor 440 sensing detectable area 444 as oval gears 408 and 410 rotate in a forward direction in response to fluid flow through the meter. Plot 490 includes time points 491*a*, 491*b*, 492*a* and 492*b*. Initially, the detection signal of non-contact sensor 440 is low indicating that oval gears 408 and 410 are in a rotational position wherein the detectable area is not within a sensing region of the sensor. The detection signal is high between time points 491*a* and 492*a*, and also 491*b* and 492*b*, and is indicative of rotational positions of the oval gears wherein the detectable area is sensed by non-contact sensor 440. The detection signal becomes low again between time points 492*a* and 491*b*, and also after time point 492*b*, and is indicative of rotational positions of the oval gears wherein the detectable area is not sensed by the sensor. The time period between time points 481*a* and 481*b*, or alternatively, 482*a* and 482*b*, may represent all the rotational positions in one full rotation of oval gears 408 and 410 as there is only one detectable area 444 in oval gear meter 400.

In this example, the rotational positions of the oval gears in one full rotation of oval gear meter 400 may be categorized into rotation states A and B. Rotation state A comprises all the rotational positions wherein detectable area 444 is not sensed by non-contact sensor 440 and is shown in plot 490 before time point 491*a*, between time points 492*a* and 491*b*, and also after time point 492*b*. Rotation state B comprises all the rotational positions wherein the detectable area is sensed by the non-contact sensor and is shown in plot 490 between time points 491*a* and 492*a*, as well as 491*b* and 492*b*. When non-contact sensor 440 senses rotation state A and B, it generates a negative and positive detection signal, respectively.

Figure 4C:
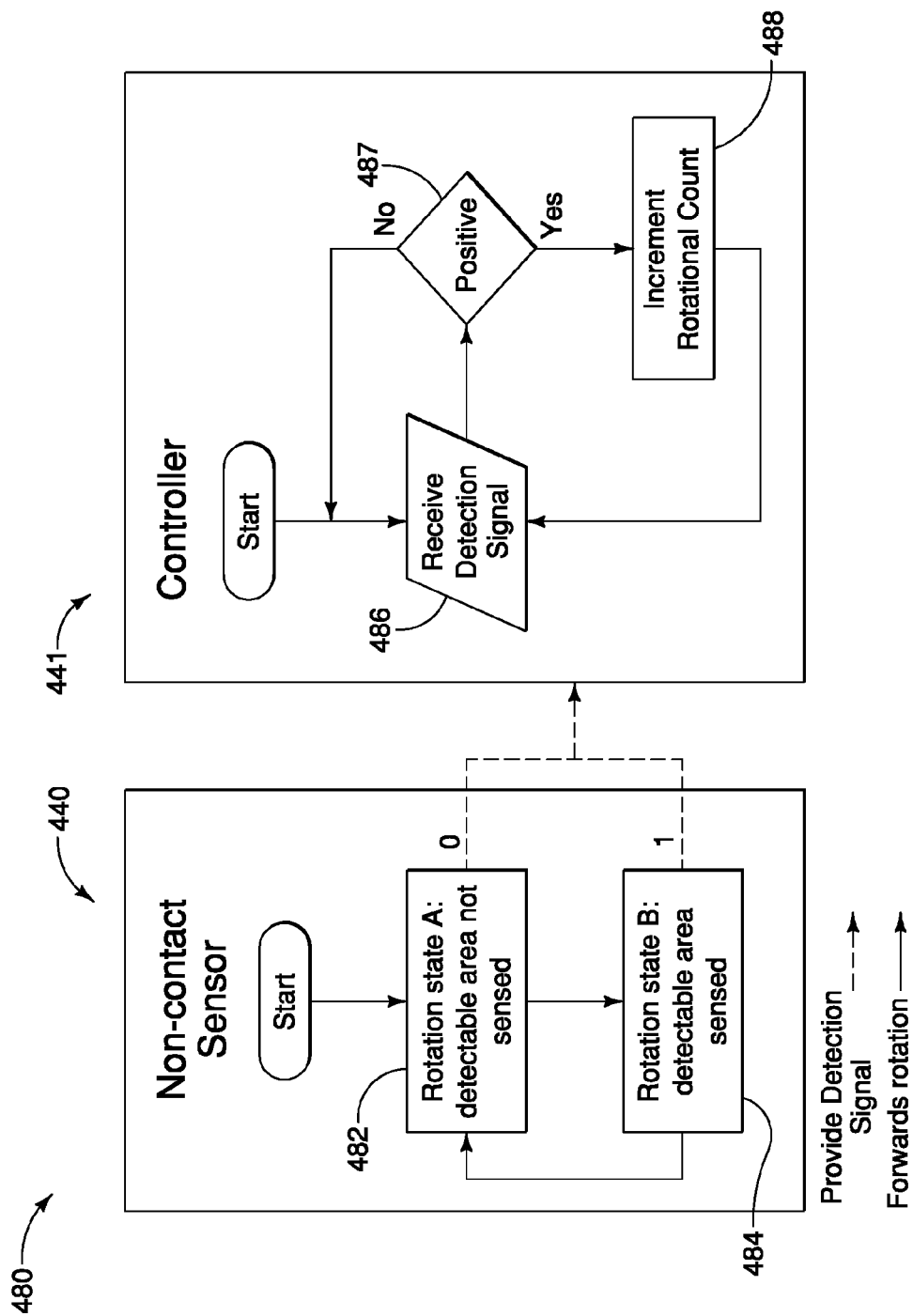
FIG. 4C is a flow diagram illustrating a method for determining a volume of fluid flow through the oval gear meter of FIG. 4A.

Oval gear meter 400 may also include a controller configured to calculate a volume of fluid flow through the meter by determining a rotational count based on the detection signals provided by non-contact sensor 440. FIG. 4C is a flow diagram 480 illustrating a method for determining a volume of fluid flow through oval gear meter 400 in response to fluid flow through the meter. Initially, non-contact sensor 440 may sense in step 482 rotation state A indicative of a rotational position of the oval gears wherein the detectable area is not within a sensing region of the sensor. As oval gears 408 and 410 rotate in a forward direction in response to fluid flow through the meter, the gears eventually reach a rotational position wherein detectable area 444 is within a sensing region of the non-contact sensor. Accordingly, non-contact sensor may sense rotation state B in step 484. It can be appreciated as the oval gears continue to rotate in oval gear meter 400, non-contact sensor 440 senses a sequence of rotation states comprising rotation state A and B, in order. As noted above, non-contact sensor 440 may be configured to generate a negative detection signal and a positive detection signal when rotation state A and B are sensed, respectively, and provide the signals to controller 441, shown in FIG. 4C as a dashed line.

Concurrently, controller 441 of oval gear meter 400 is configured to receive the detection signal from non-contact sensor 440 and determine a rotational count. The controller is initially in a state of receiving 486 wherein the controller is configured to receive a detection signal from the non-contact sensor. Upon receiving a detection signal indicative of both a rotation state and a rotational position of oval gears 408 and 410, the controller determines in step 487 whether the detection signal is positive. If the detection signal is positive then the controller increments the rotational count and returns back to receiving state 486. If the detection signal is negative, then the controller returns back to receiving state 486 without incrementing the rotational count. Referring back to FIG. 4B, it can be appreciated that a rotational count of oval gear meter may be incremented by controller 441 at time points 491*a* and 491*b* when the detection signal goes from low to high. It can be appreciated that the method of FIG. 4C may alternatively be configured to increment a rotational count when the detection signal goes from high to low (e.g., at time points 492*a* and 492*b*) by modifying step 487 to check to see if the detection signal is negative. In this example, because non-contact sensor 440 senses the detectable area 444 only once during each rotation, every increment of rotational count in step 488 corresponds with one full rotation of the oval gears. It can be appreciated that a volume of fluid flow through oval gear meter 400 may be determined using the rotational count and a known volume of fluid pockets of the meter.

As noted above, oval gear meters including non-contact sensors tend to measure fluid volume accurately in applications having a high fluid flow rate or a relatively uniform fluid flow (e.g., fluid provided by peristaltic pumps or from pressure-maintained fluid lines). In these applications, the uniformity of flow tends to provide for continuous rotation of the oval gears in a forward direction, which is conducive to an accurate measurement of fluid flow. In applications having low fluid flow rates or where the fluid flow is non-uniform, oval gear meters including non-contact sensors may have a lower accuracy of measurement. These applications tend to provide an irregular flow rate thereby causing non-continuous rotation of the oval gears, which may include a backwards rotation of the oval gears. For example, non-uniform flow generated by a diaphragm pump may cause pressure shocks which generate fluid oscillations in the fluid lines after each pump cycle. The fluid oscillations may produce vibrations, or "jitter," of the oval gears or backflow of fluid into the oval gear meter from the fluid outlet. Jitter or backflow of fluid occurring when the oval gears are in a rotational position wherein the detectable area is near a sensing region of the non-contact sensor may induce false detection signals from the sensor which may cause a controller to generate an inaccurate rotational count. Accordingly, the controller may calculate an inaccurate volume of fluid flow through the oval gear meter based on the inaccurate rotational count.

FIGS. 5A and 5B are partial top views of rotational positions of an oval gear meter 500. The rotational positions shown in the figures show a detectable area 542 provided on an oval gear 508 in different positions relative to a non-contact sensor 540, which is stationary, as oval gear 508 rotates in response to fluid flow through the oval gear meter. FIG. 5A shows a rotational position of oval gear 508 immediately before detectable area 542 enters into a sensing region of non-contact sensor 540 wherein the non-contact sensor generates a negative detection signal. FIG. 5B shows a rotational position immediately after the detectable area has entered into the sensing region of non-contact sensor 540 wherein the non-contact sensor generates a positive detection signal. In applications where fluid flow through oval gear meter 500 is low or non-uniform, fluid oscillations may cause oval gear 508 to vibrate or jitter between the rotational position shown in FIG. 5A and the rotational position shown in FIG. 5B. This jitter of oval gear 508 may in turn cause non-contact sensor 540 to generate a detection signal that quickly oscillates between positive and negative.

FIG. 5C is a plot 590 of the detection signal of non-contact sensor 540 of oval gear meter 500 of FIGS. 5A and 5B over time. Plot 590 shows a forward rotation of oval gear 508 in response to fluid flow through oval gear meter 500 between time points 591a and 593a. Between time points 591a and 592a, non-contact sensor detects a rotation state B indicative of rotational positions of the oval gear wherein non-contact sensor 540 detects the detectable area 542. The non-contact sensor senses a rotation state A between time points 592a and 593a indicative of rotational positions of the oval gear wherein the sensor does not sense the detectable area. Non-contact sensor generates a negative and positive detection signal when it senses rotation state A and B, respectively.

Between time points 593a and 591b, plot 590 shows the detection signal of non-contact sensor 540 quickly oscillating between low and high indicative of jitter of oval gear 508. During this time period, oval gear 508 may be oscillating between the rotational positions shown in FIGS. 5A and 5B. Similarly, the detection signal between time points 592c and 593b is also indicative of jitter of oval gear 508, wherein the gear quickly oscillates between a rotational position immediately before detectable area 542 exits the sensing region of non-contact sensor 540 and a rotational position immediately after the detectable area has exited the sensing region of the sensor.

Oscillations in a detection signal may provide false readings to a controller, inducing the controller to miscalculate a volume of fluid flow through an oval gear. For example, a controller of oval gear meter 500 may be configured to determine a rotational count using a method similar to the method shown in diagram 480 of FIG. 4C, wherein the controller increments a rotational count every time the detection signal goes from low to high. As noted above, the rotational count corresponds to a number of rotations of the oval gear and is indicative of a volume of fluid flow through the oval gear meter. In this example, the jitter induced oscillations of the detection signal between time points 593a and 591b, as well as 592c and 593b, may cause the controller of oval gear meter 500 to falsely increment the rotational count. More specifically, the oscillations of the detection signal between these time periods are indicative of a rotational advancement of oval gear 508 when in fact the oval gear has not rotated forward at all. Thus, the controller is induced by the jitter to determine a rotational count that misrepresents the number of rotations of oval gear 508 which in turn may lead to a miscalculation of a volume of fluid flow through the meter.

Error induced by jitter and backflow may be reduced by configuring an oval gear meter to detect and disregard backwards rotation of oval gears of the meter. In one example, an oval gear meter may include a plurality of non-contact sensors positioned to detect a rotational direction of the oval gears of the meter. The oval gear meter may further also include a controller configured to determine a rotational count based only on the forwards rotation of the oval gears, thereby disregarding any backwards rotation of the gears that may be caused by jitter or backflow.

FIG. 6A is a top plan view of an oval gear meter 600 configured to sense a rotational direction, and amount, of oval gears 608 and 610. Oval gear meter 600 includes non-contact sensors 640 and 645 and oval gears 608 and 610, wherein oval gear 610 includes a detectable area 644. As in other examples, non-contact sensors 640 and 645 may each be configured to generate detection signals in response to sensing detectable area 644. Non-contact sensors 640 and 645 may be linearly positioned along a rotational path of the oval gear 610 such that rotation of the oval gears in response to fluid flow through the meter may cause detectable area to first enter a sensing region of non-contact sensor 640 and then subsequently enter a sensing region of non-contact sensor 645. Furthermore, the non-contact sensors may be positioned such that at least one rotational position of the oval gears causes both non-contact sensors to simultaneously sense detectable area 644.

FIG. 6B provides partial top views of rotational positions of oval gear meter 600. More specifically, FIG. 6B illustrates rotational positions 670-678 of oval gear 610 (not shown) rotating in a forward direction along a rotational path 611 of oval gear 610 such that detectable area 644 passes through the sensing regions of non-contact sensors 640 and 645. Each rotational position is associated with a sequence of rotational states A through D, wherein the order of the sequence corresponds with the forward rotation, or advancement, of oval gears 608 and 610 of oval gear meter 600. In this example, rotation state A is indicative of all the rotational positions wherein detectable area 644 is outside of the sensing regions of both non-contact sensors 640 and 645 and includes rotational positions 670 and 678; rotation state B is indicative of all the rotational positions wherein the detectable area is only sensed by non-contact sensor 640 and includes rotational position 672; rotation state C is indicative of all the rotational positions wherein the detectable area is sensed by both the non-contact sensors and includes rotational position 674; and rotation state D is indicative of all the rotational positions wherein the detectable area is only sensed by non-contact sensor 645 and includes rotation position 676. As shown in FIG. 6B, the forward rotation of oval gear 610 through rotational positions 670 through 678 in response to fluid flow through the oval gear corresponds with the order of the sequence of rotation states A through D. Thus, the sequence of rotation states is indicative of a rotational direction of oval gears 608 and 610. For example, where the non-contact sensors sense rotation states B and then C, the order in which the rotation states is sensed is indicative of a forward rotation of the oval gears. Where the non-contact sensors sense rotation states C then B, the order of the rotation states sensed is indicative of a backwards rotation. Thus, a rotational direction of oval gears 608 and 610 may be collectively sensed by oval gear meter 600.

FIG. 6C is a table 650 showing the rotation states of oval gear meter 600 of FIG. 6A. Table 650 also shows the corresponding detection signals generated by non-contact sensors 640 and 645 for each rotation state. It can be appreciated one full rotation of oval gears 608 and 610 in response to fluid flow through oval gear meter 600 corresponds with one sequence through the rotation states A through D. Thus, the number of rotations of the oval gear may be determined based on the rotation states sensed by the non-contact sensors.

In one example, oval gear meter 600 may include a controller configured to determine a rotational count of the flow meter based on the rotation states sensed by the non-contact sensors and determine a volume of fluid flow. For example, the controller of oval gear meter 600 may be configured to receive the detection signals of the non-contact sensors indicative of a rotation state sensed by the non-contact sensors and advance through the sequence of rotation states of table 650 of FIG. 6C to determine a rotational count. Because the controller only advances through the sequence of rotation states, the controller effectively disregards backwards rotation of the oval gears that may be caused by jitter or backflow.

Figure 7:
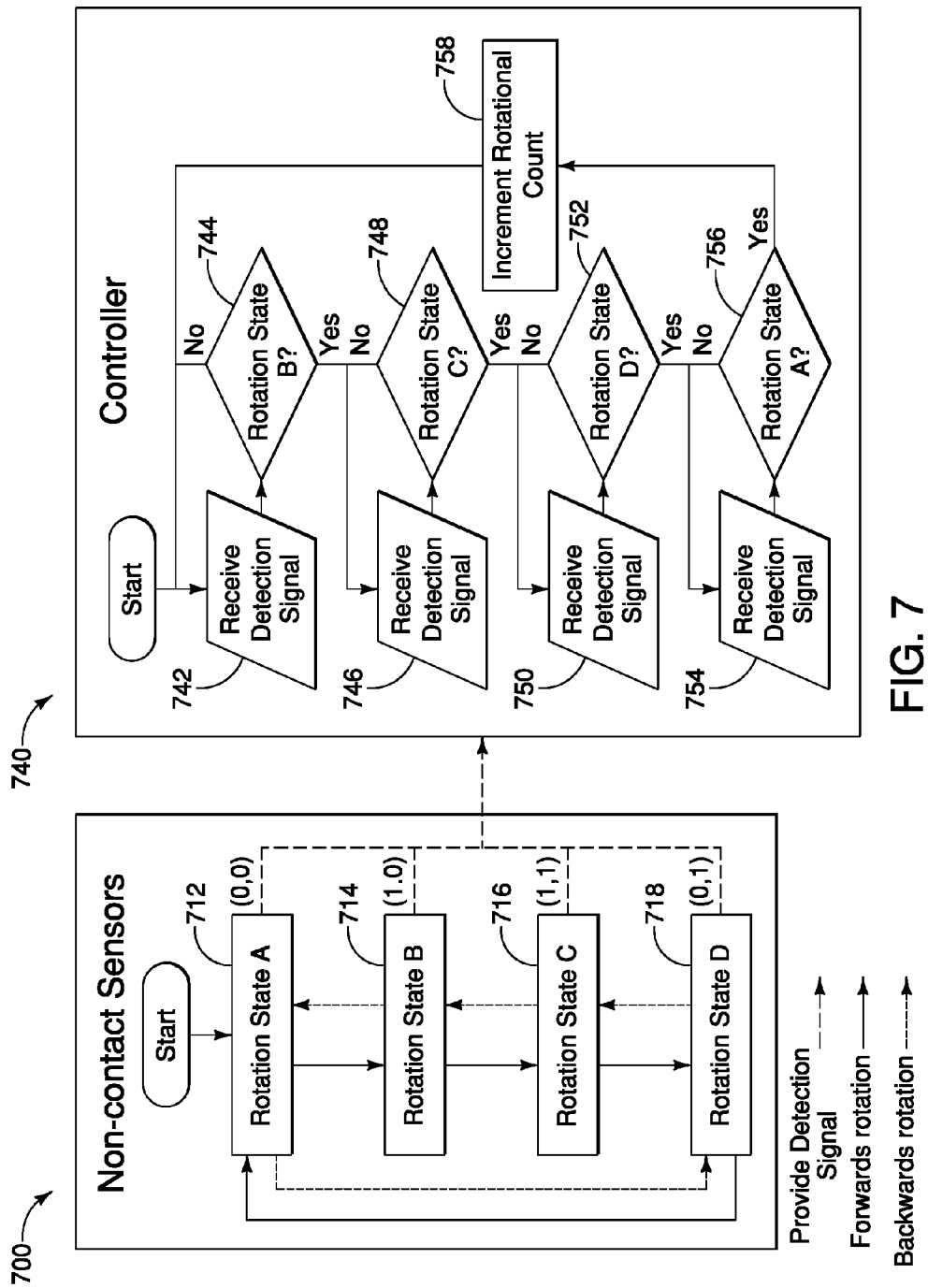
FIG. 7 is a flow diagram illustrating a method for determining a volume of fluid flow through the oval gear meter of FIG. 6A.

FIG. 7 is a flow diagram 700 illustrating a method for determining a volume of fluid flow through oval gear meter 600 of FIG. 6A. Diagram 700 illustrates non-contact sensors 640 and 645 of oval gear meter 600 responding to a forward rotation of oval gears 608 and 610 during normal operation of the flow meter. As noted above, the non-contact sensors are configured to sense rotation states A-D, wherein each rotation state is associated with a plurality of rotational positions of the oval gears and wherein the sequence of rotation states A through D correspond with a forward rotation of the oval gears. Thus, as the rotational position of the oval gears advance in response to fluid flow through the flow meter, the rotation states also advance through the sequence of rotations states A through D, in order, as shown by the solid arrows in diagram 700. Diagram 700 also illustrates non-contact sensors 640 and 645 responding to a backward rotation of oval gears 608 and 610 that may be caused by jitter or backflow. As the rotational position of the oval gears regress in response to jitter or backflow, the rotation state may also regress as shown by the dotted arrows in diagram 700.

Non-contact sensors 640 and 645 may be configured to provide detection signals to a controller 740 of oval gear meter 600. In this example, the detection signals generated by the non-contact sensors and provided to controller 740 for each rotation state may be in accordance with table 650 of FIG. 6C. For example, oval gears 608 and 610 may be in a rotational position associated with rotation state B. In accordance with table 650, non-contact sensors 640 and 645 will provide a positive detection signal and a negative detection signal, respectively, and denoted in diagram 700 as the ordered pair (1,0), wherein the first value in the pair represents the detection signal of non-contact sensor 645 and the second value in the pair represents the detection signal of non-contact sensor 645. In certain examples, the non-contact sensors may be configured to continuously provide this pair of detection signals to the controller so long as the oval gears remain in a rotational position associated with rotation state B. In other examples, the non-contact sensors may be configured to periodically provide a detection signal to controller 740, or respond to a poll originating from the controller to the non-contact sensors. It can be appreciated that any suitable means of providing the detection signals of the non-contact sensors to a controller may be employed by an oval gear meter.

Concurrently, controller 740 of oval gear meter 600 may be configured to increment a rotational count that may be used to calculate a volume of fluid flow of the meter based on the detection signals provided by non-contact sensors 640 and 645. More specifically, the controller is configured to receive the detection signals from the non-contact sensors and determine whether the received detection signals match an expected rotation state corresponding to a forward rotation of oval gears 608 and 610. It can be appreciated that the method of diagram 700 shows controller 740 advancing through the sequence of rotation states A through D as the order of the expected rotation states in steps 744, 748, 752 and 756 correspond with the order of the sequence of rotation states A through D. In this example, the controller is initially in a receiving state 742 wherein the controller is configured to receive the detection signals provided by non-contact sensors 640 and 645. The detection signals received may be indicative of a current rotation state sensed by the non-contact sensors based on the current rotational position of oval gears 608 and 610. Upon receiving the detection signals in receiving state 742, the controller may compare in step 744 the received detection signals with an expected rotation state. In this step, the controller expects the next rotation state to be rotation state B which comprises a positive detection signal from non-contact sensor 640 and a negative detection signal from non-contact sensor 645. If the detection signals received from the non-contact sensors in receiving state 742 is not equivalent to the detection signal of rotation state B the controller returns to receiving state 742. It can be appreciated that the controller alternates between receiving state 742 and the comparison of step 744 until the controller receives detection signals equivalent to the detection signals of rotation state B, at which point the controller advances to receiving state 746. The controller then alternates between receiving state 746 and a comparison of step 748 until the controller receives detection signals from the non-contact sensors equivalent to the detection signals of rotation state C, after which the controller advances to receiving state 750. As can be appreciated, the controller performs similar steps with respect to receiving state 750 and a comparison to rotation state D in step 752, as well as receiving state 754 and a comparison to rotation state A in step 756. After the controller receives detection signals in receiving state 754 that are equivalent to the detection signals of rotation state A, the controller advances from step 756 and increments a rotational count in step 758 before returning to receiving state 742.

In one example, oval gears 608 and 610 of oval gear meter 600 may initially be in a rotational position associated with rotation state A. Accordingly, non-contact sensors 640 and 645 may sense rotation state A in step 712 and each provide a negative detection signal to controller 740. The controller receives the detection signals corresponding to rotation state A in receiving state 742 and determines in step 744 that they are not equivalent to the detection signals of rotation state B. Accordingly, the controller returns to receiving state 742 and continues to alternate between receiving state 742 and step 744. As oval gears 608 and 610 rotate in a forward direction in response to fluid flow, the gears eventually reach a rotational position associated with rotation state B which may be sensed by the non-contact sensors. Controller 740 receives the detection signals in receiving state 742 and validates that the signals correspond to expected rotation state B in step before advancing to receiving state 746. It can be appreciated that as the rotational position of the oval gears advance, the non-contact sensors sense the associated rotation states and provide the corresponding detection signals to the controller. The controller then advances through the sequence of rotation states A through D as each respective rotation state is received. As noted above, once the controller has advanced through the expected sequence of rotation states it increments the rotational count to reflect the advancement of the rotation position of the oval gears before repeating the process.

In another example, oval gears 508 and 510 of oval gear meter 600 may rotate backwards in response to jitter or backflow. In this example, the oval gears may initially be in a rotational position associated with rotational state B. This rotation state is sensed by non-contact sensors 640 and 645 in step 714 and the corresponding detection signals may be provided to controller 740. The controller may receive the detection signals in receiving state 746 and compare them to the detection signals corresponding with expected rotation state C. Because the received detection signals do not correspond to expected rotation state C, the controller returns to receiving state 746. Controller 740 will continue to alternate between receiving state 746 and step 748 until it receives detection signals associated with expected rotation state C. In this situation, jitter or backflow in oval gear meter 600 may cause the rotational position of the oval gears to regress to a rotational position corresponding to rotation state A. The non-contact sensors may then sense rotation state A in step 712 and provide the corresponding detection signals to the controller. Because the received detection signals still do not correspond to expected rotation state C, controller 740 continues to alternate between receiving state 746 and step 748 as it waits for the oval gears to reach rotation state C. Thus, the controller is configured to effectively disregard backwards rotation of oval gears 608 and 610 as it advances through the rotation states based only on forward rotation of the oval gears.

Figure 8A:
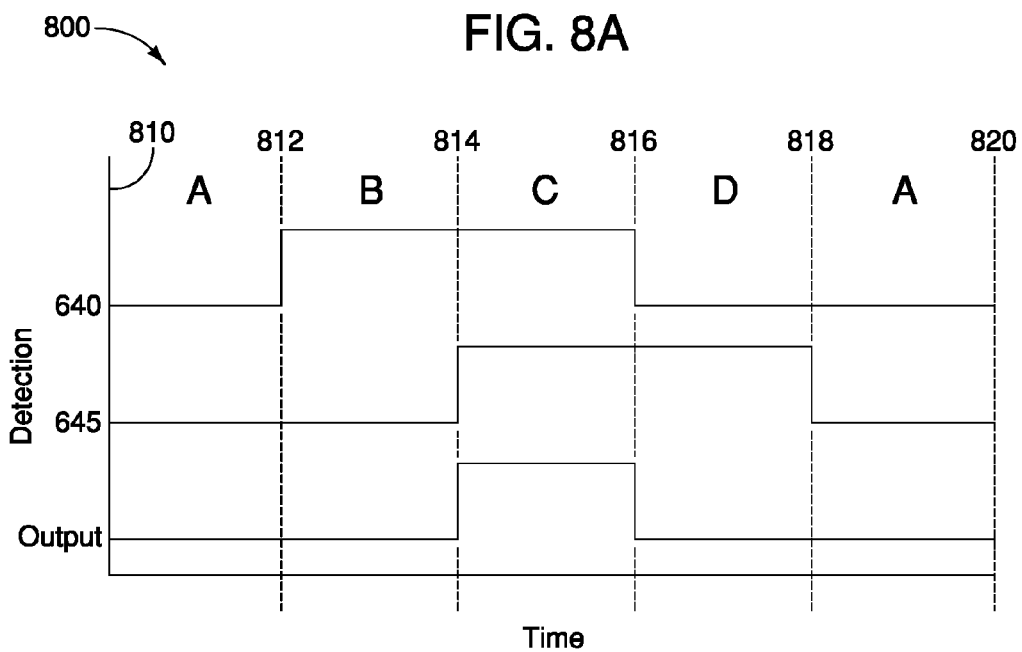
FIGS. 8A and 8B provide plots of detection signals and an output signal of the oval gear meter of FIG. 6A over time.

FIG. 8A is a plot 800 of detection signals and an output signal of oval gear meter 600 of FIG. 6A over time. The plot includes time points 810-820 and also an output signal generated by a controller of oval gear meter 600. The plot charts detection signals of non-contact sensors 640 and 645 over time as oval gears 608 and 610 rotate in a forward direction in response to fluid flow through oval gear meter 600. As shown in plot 800, initially the oval gears are in a rotational position corresponding with rotation state A as the detection signals of both non-contact sensor 640 and 645 are negative. Between time points 812 and 814, the oval gears are in a rotational position corresponding with rotation state B as the detection signal of non-contact sensor 640 is positive and the detection signal from non-contact sensor 645 is negative. Plot 800 also shows the oval gears rotating through rotational positions corresponding to rotation state C, D and then A again during the time periods between time points 814 and 816, 816 and 818, and 818 and 820, respectively.

Plot 800 also shows an output signal that may be generated by a controller of oval gear meter 600 based on the detection signals provided by the non-contact sensors. In this example, the controller may be configured to generate a negative output signal where at least one of the detection signals provided by non-contact sensors 640 and 645 is negative, for example between time points 810 and 814, and 816 and 820. The controller may be further configured to generate a positive output signal where both detection signals provided by the non-contact sensors are positive, for example between time points 814 and 816. Such an output signal generated by the controller may be used to increment a rotational count of oval gear meter 600. For example, a controller may be configured to produce the output signal of plot 800 and increment a rotational count of the oval gear meter whenever the output signal goes from low to high (e.g., time point 814), or alternatively, when it goes from high to low (e.g., time point 816). It can be appreciated that in this example, the period of the output signal corresponds with one sequence through rotation states A through D of oval gear meter 600, which represents one full rotation of oval gears 608 and 610. Thus, the output signal may be examined by the controller to determine a rotational count that may be used to calculate a volume of fluid flow through the meter.

Figure 8B:
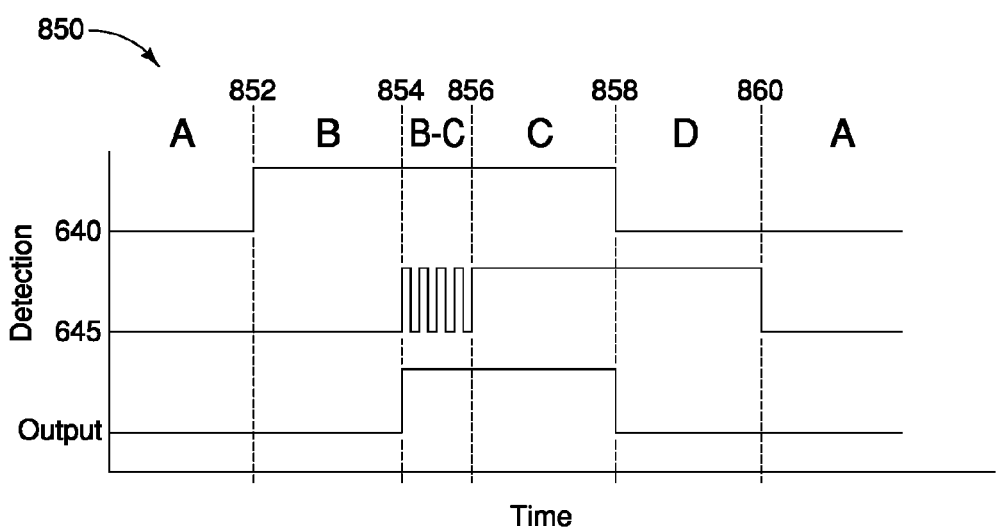

A controller of oval gear meter 600 may also be configured to generate an output signal that does not reflect a backwards rotation of the oval gears that may be caused by jitter or backflow. FIG. 8B is a plot 850 of detection signals and an output signal of oval gear meter 600 of FIG. 6A over time. Plot 850 additionally shows jitter of oval gears 608 and 610 occurring between time points 854 and 856 wherein the detection signal sensed by non-contact sensor 645 oscillates between high and low thereby causing the non-contact sensors to sense an oscillation between rotations states B and C. In this example, a controller of oval gear meter 600 may be configured to generate an output signal based only on the advancement through the sequence of rotation states A through D to effectively disregard jitter. For example, the controller may be configured to utilize a method similar to the method shown in diagram 700 of FIG. 7. Referring to FIG. 7, an additional step of "generate a positive output signal" may be added in between step 748 and receiving state 750. Accordingly, where a controller is alternating between receiving state 750 and step 752 as it waits for expected rotation state D, the controller will also continue to generate a positive output signal. Once the controller receives detection signals corresponding to expected rotation state D, then the controller stops generating the positive output signal. Referring back to FIG. 8B with reference to FIG. 7, between time points 852 and 854, the controller is expecting rotation state C and is alternating between receiving state 746 and step 748. At time point 854, the controller receives detection signals from the non-contact sensors corresponding to rotation state C, advances, and alternates between receiving state 750, step 752 and the additional step described above of "generate a positive output signal" as the controller waits for expected rotation state D. Accordingly, the output signal of plot 850 remains high between time points 854 and 856 even as the non-contact sensors oscillate between rotation states B and C as the controller continues to wait for expected rotation state D and remains high between time points 856 and 858. The controller receives detection signals corresponding to rotation state D at time point 858 wherein the controller advances from step 752 to receiving state 754. It can be appreciated that as the controller alternates between receiving state 754 and step 756, the controller no longer executes the additional step of "generate a positive output signal," thus the output signal of plot 850 becomes low at time point 858.

One skilled in the art will appreciate that the method shown in diagram 700 only illustrates one example of an oval gear meter configured to calculate a volume of fluid flow through the meter by advancing through a sequence of rotation states and is not limiting to the scope of the present application. Different methods may be used for different configurations of an oval gear meter.

In one example, an oval gear meter may have a controller having a defined direction of rotation for forward flow comprising the rotation state sequence A-B-C-D-A, etc., during normal operation of the meter in response to fluid flow though the meter. The controller may also have a defined direction of rotation for backflow comprising the rotation state sequence of A-D-C-B-A, etc. The controller may be configured to generate a rotational count wherein the rotational count receives a positive increment at each forward rotation state transition corresponding to a transition of rotation states in an order corresponding with forward flow (e.g., from A to B, B to C, C to D and D to A), and a negative increment at each backward rotation state transition corresponding to a transition of rotation states in an order corresponding with backflow (e.g., from A to D, D to C, C to B, B to A). In this example, when the rotational count equals one, the controller may also be configured to generate an output signal pulse, reset the rotational count to zero, then wait for a next transition of the rotation state. It can be appreciated that the controller may generate a rotational having a negative value due to multiple negative increments in response to a prolonged period of jitter or backflow. In this situation, the negative value of the rotational count should be compensated by the controller with an appropriate number of positive increments in response to forward rotation of the oval gears before another output signal pulse is generated. Only when all the negative increments have been compensated for (e.g., to reach a rotational count of zero), and an additional positive increment is generated in response to forward rotation of the oval gears (e.g., a rotational count of one) will the controller generate an output signal pulse. In another example, the controller may be configured to have a lower limit for the rotational count such that the rotational count may not be negatively incremented below a lower bound. When the value of the rotational count is equal to the lower bound, the controller may be configured to no longer decrement the rotational count but continue to increment the rotational count in response to forward rotation of the oval gears. When the rotational count reaches the lower bound due to jitter or backflow the controller may also be configured to generate a backflow signal indicating that the lower bound for the rotational count has been reached and that backflow is detected in the oval gear meter. When all the negative increments have been compensated for with positive increments, and an additional positive increment is made, the controller may stop generating the backflow signal and generate an output signal pulse.

In another example the controller may be configured to generate a second output signal associated with a second rotational state. The second rotational count may receive a positive increment in response to a forward rotation state transition and a negative increment in response to a backward rotation state transition. When the second rotational count equals negative one, the controller may be configured to generate a second output signal pulse, set the second rotational counter to zero, then wait for the next rotation state transition. In another example, the second rotational count may have an upper limit for the second rotational count such that it cannot be positively incremented above an upper bound. When the value of the second rotational count reaches the upper bound due to forward rotation of the oval gears, the controller may be configured to generate a forward flow signal indicating that the upper bound for the second rotational count has been reached and that forward flow is detected in the oval gear meter. In certain examples, an upper bound and a lower bound may comparable positive and negative values. For example the lower bound may be between −2 and −32, and an upper bound may have a comparable positive value between 2 and 32. The value of the upper bound may vary depending on a configuration of an oval gear. For example, the upper bound and the lower bound may correspond to the number of rotational counts associated with a full rotation of the oval gears. In another example, the controller may be configured to divide the output signal pulses by an integer divider to increase stability in the output signal. For example, when the integer divider is set for eight, it decreases the standard deviation for a volume associated with each pulse.

FIG. 9A is a top plan view of an oval gear meter 900 including four detectable areas and four non-contact sensors. In this example, the additional detectable areas and sensors provide oval gear meter 900 with a higher measurement resolution than oval gear meter 600 of FIG. 6A. Oval gear meter 900 includes oval gear 908 having detectable areas 942 and 944, oval gear 910 having detectable areas 952 and 954, and non-contact sensors 940, 945, 950 and 955. Non-contact sensors 940 and 945 are positioned linearly along a rotational path oval gear 908 such that both detectable areas 942 and 944 pass through a sensing region of each sensor. As shown in FIG. 9A, non-contact sensors 950, 955, oval gear 910 and detectable areas 952 and 954 are disposed in a similar configuration.

The configuration of oval gear meter 900 provides for the rotational positions in one full rotation of oval gears 908 and 910 to be divided into eight rotation states A through H. FIG. 9B is a table 960 showing each rotation state and the corresponding detection signals from each non-contact sensor. In this example, oval gear meter 900 is configured such that cycling through the sequence of rotation states A through H once corresponds with a half rotation of oval gears 908 and 910. For example, the non-contact sensors may sense rotation states A through D as detectable area 942 passes through the sensing regions of non-contact sensors 940 and 945. As the oval gears continue to rotate in a forward direction, rotation states E through H may be sensed by the non-contact sensors as detectable area 952 passes through the sensing regions of non-contact sensors 950 and 955. Upon reaching rotation state H, it can be appreciated that the oval gears have completed half a rotation as only two of the four detectable areas have been sensed. The sequence of rotation states A through H may be repeated with regard to detectable areas 944 and 954.

Oval gear meter 900 may include a controller configured to advance through the sequence of rotation states A through H and calculate a volume of fluid flow through the meter. One skilled in the art will appreciate that the controller of oval gear 900 may be configured to perform a method similar to the method of FIG. 7 except with more rotation states. For example, the non-contact sensors may be configured to collectively detect rotation states A through H indicative of a rotational position of oval gears 908 and 910 and each generate and provide a detection signal to the controller of the meter. The controller may be configured to receive detection signals from the four non-contact sensors, advance through the sequence of rotation states A through H, and increment a rotational count upon reaching an end of the sequence. In one example, the controller may be configured to increment the rotational count fractionally when the end of the sequence is reached, for example by 0.5, to reflect that one cycle through the sequence of rotation states A through H of oval gear meter 900 is indicative a half rotation of oval gears 908 and 910. In another example, the measurement resolution of the oval gear meter may be increased by configuring the controller to increment the rotational count twice, once after rotation state D is reached, and once again after rotation state H is reached, wherein each increment of the rotational count corresponds to a quarter rotation of the oval gear indicative of the volume of one fluid pocket of oval gear meter 900.

That the configuration of oval gear meter 900 is such that the detection signals corresponding to rotation state A and rotation state E are identical. Accordingly, the non-contact sensors may not be able to distinguish between the two rotation states. It can be appreciated, however, that not every rotation state of a sequence of rotation states need be unique for a controller to advance through the sequence. One skilled in the art will also appreciate that an oval gear meter may include any number of non-contact sensors and detectable areas to define any number of rotation states. Furthermore, the detectable areas may be of any suitable shape or size and may be in any position on the oval gears.

Thus, certain examples have been described with regard to an oval gear meter configured to disregard jitter or backflow using a sequence of rotation states of the meter. Such oval gear meters may be particularly useful in systems with non-uniform flow conditions or low flow rates as they are configured to provide a more accurate measurement of fluid flow volume through the system. In another example, measurement accuracy of an oval gear meter may be increased by reducing jitter or backflow that may cause error in an oval gear meter.

Figure 10:
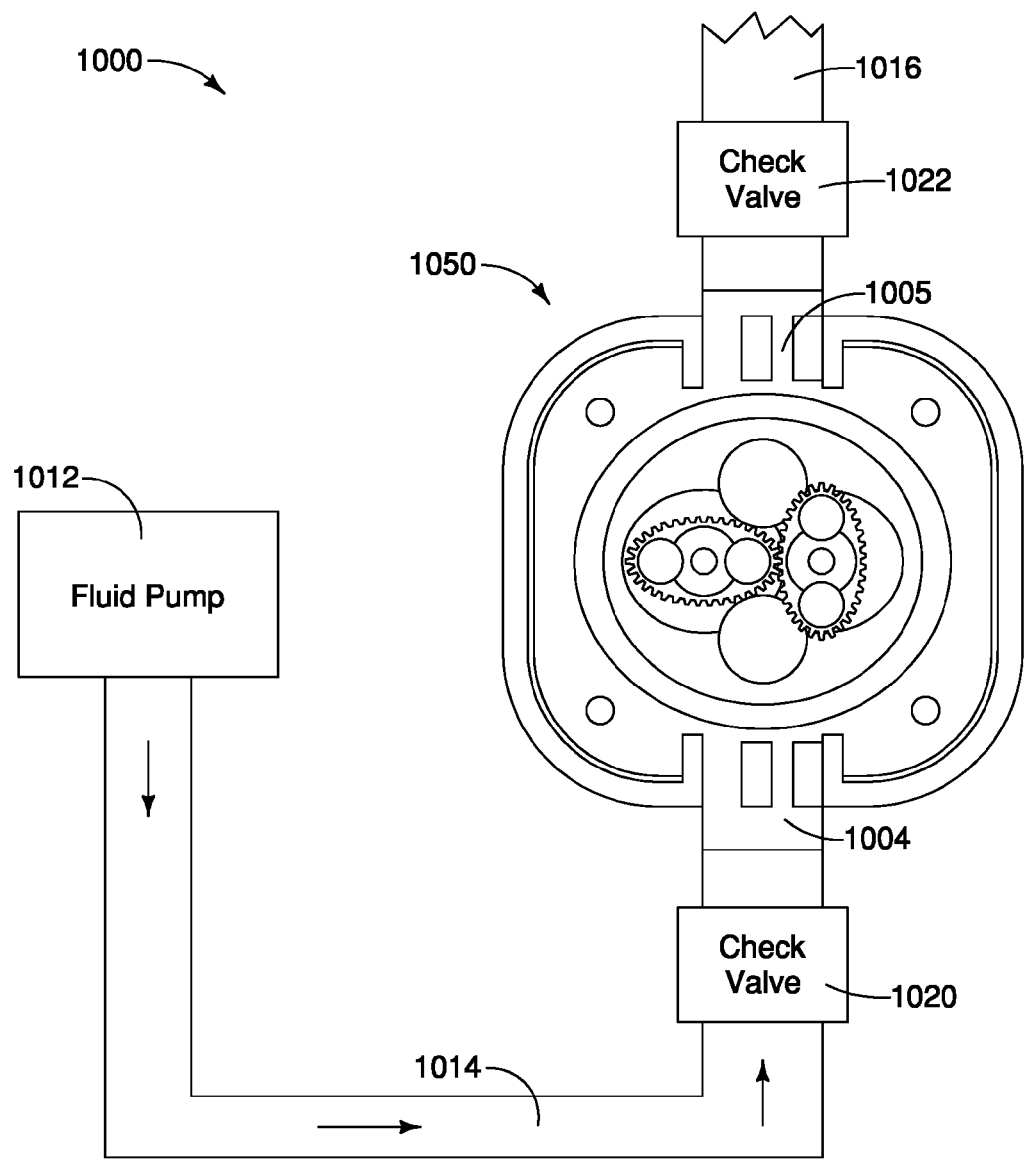
FIG. 10 is a top plan view of a fluid flow measurement system including check valves.

FIG. 10 is a top plan view of a fluid flow measurement system 1000 including check valves 1020 and 1022. System 1000 is similar to system 10 of FIG. 1. Fluid pump 1012 is configured to provide a fluid flow through system 1000 and is in fluid communication with an oval gear meter 1050 configured to measure the fluid flow by way of fluid line 1014. Fluid pump 1012 may be any suitable fluid pump and may provide fluid flow with a variety of characteristics. For example, fluid pump 1012 may be configured to provide a non-uniform fluid flow with a low flow rate. As noted above, such fluid flow characteristics may cause jitter or backflow of fluid that may affect the accuracy of oval gear meter 1050. Accordingly, system 1000 may include check valves 1020 and 1022 to reduce jitter and backflow in the system. The check valves are configured to only allow fluid flow in a first direction and prevent fluid flow in a second direction. In this example, check valve 1020 may be installed in fluid line 1014 upstream of oval gear meter 1050 and oriented to allow fluid to flow forwards into the oval gear meter and prevent backflow out of the meter into fluid line 1014. Similarly, check valve 1022 may be installed in fluid line 1016 downstream of oval gear meter and oriented to allow fluid to flow forwards out of the oval gear meter and prevent backflow into the meter from fluid line 1016. Accordingly, the check valves only allow fluid to flow in a forwards direction through oval gear meter 1050 thereby reducing backflow that may cause jitter in system 1000. It can be appreciated that a reduction of jitter or backflow in the system may allow for more accurate flow volume measurements from oval gear meter 1050.

Check valves 1020 and 1022 may comprise any suitable valve that provides for flow in a first direction and prevents flow in a second direction. In one example, check valves 1020 and 1022 may comprise ball check valves with springless members. In another example, the check valves may be installed between 1 to 5 inches of the oval gear meter. In certain examples, check valves 1020 and 1022 may be set directly on oval gear meter 1050 or integrated or molded directly into oval gear meter 1050.

In another example, system 1000 may be configured such that oval gear meter 1050 is vertically oriented to prevent air from accumulating in the oval gear meter. It can be appreciated that the fluid in a chamber of an oval gear meter may help dampen vibrations, or jitter, of the oval gears. Therefore, the presence of air (e.g., bubbles) in the chamber may lessen the dampening effect of the fluid on the oval gears which may increase vibrations of the oval gears. Accordingly, reducing an accumulation of air in a chamber of an oval gear meter may also reduce jitter of the oval gears. System 1000 may be configured such that oval gear meter 1050 is vertically oriented to allow an accumulation of air in the oval gear meter to escape. In one example, system 1000 may include check valves 1020 and 1022 comprising springless ball check valves and an oval gear meter vertically oriented such that fluid flow through the oval gear meter flows up against gravity. One skilled in the art will appreciate that this particular orientation will allow bubbles in the oval gear to escape from the oval gear without being impeded by the check valves.

As noted above, another cause of measurement error in an oval gear meter may be the leakage of fluid around the oval gears of the meter. Referencing FIG. 3A, generally, an oval gear meter may include a housing 302 defining a chamber 306 and two oval gears 308 and 310 that are configured to rotate in response to fluid flow through the meter. Each oval gear may include teeth that are configured to intermesh as to not allow fluid to pass between the gears. Accordingly, fluid entering the meter through fluid inlet 304 may be forced towards the wall of the chamber and a vertex 309 and 311 of each respective oval gear which urges the rotation of the oval gears. Each oval gear is generally configured so that there is gap between the wall of the chamber and a tooth at the vertex of each oval gear. The cap is appropriately small to minimize leakage between the oval gear and the chamber wall, but appropriately large as to allow the oval gears to prevent the tooth from scraping against the wall thereby impeding the rotation of the gear. Applicants have found that oval gear meters in low flow applications may have increased measurement error due to leakage of fluid through this gap between the gear and the chamber wall when compared to applications with a higher fluid flow.

Figure 11A:
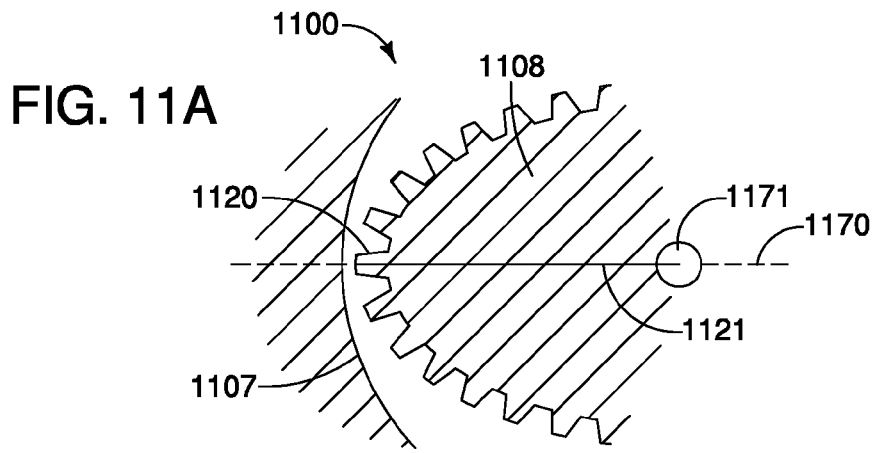
FIGS. 11A-C provide partial top views of an oval gear meter.

FIG. 11A shows a partial top view of an oval gear meter 1100. In this example, oval gear meter 1100 includes a chamber wall 1107 and an oval gear 1108. Oval gear 1108 includes a tooth 1120 positioned at an end of major axis 1170 of the oval gear. A gap between tooth 1120 and chamber wall 1107 is configured to minimize leakage of fluid between oval gear 1108 and the chamber wall and allow rotation of the oval gear without scraping against the chamber wall. As noted above, applicants have found that this configuration of oval gear 1108 may have increased measurement error in low flow applications due to leakage of fluid through this gap.

Figure 11B:
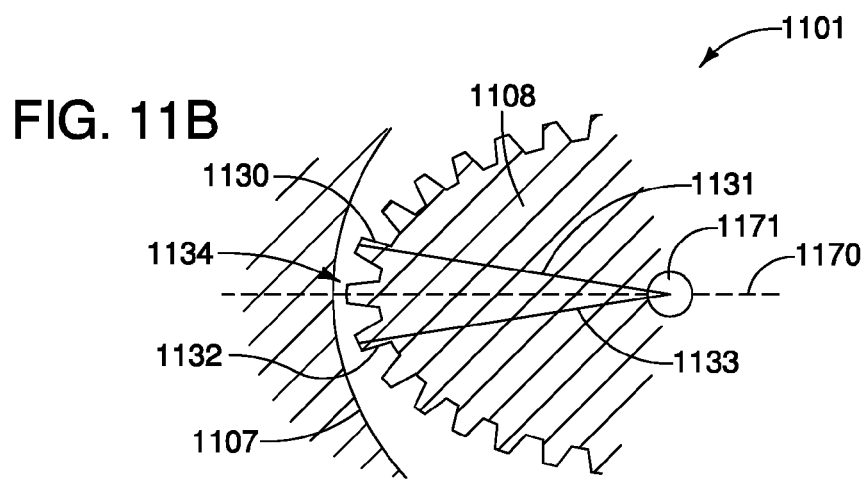

FIG. 11B shows a partial top view of an oval gear meter 1101. Oval gear meter 1101 is similar to oval gear 1100 of FIG. 11A except that the teeth of oval gear 1108 have been shifted such that two teeth 1130 and 1132 are positioned at an end of major axis 1170 instead of one tooth. In this example, the radial distances 1131 and 1133 from the tips of teeth 1130 and 1132, respectively, to a center 1171 of the oval gear are equal. Accordingly, the gap between tooth 1130 and the chamber wall is also equal to the gap between tooth 1132 and the chamber wall. A pocket of fluid 1134 is formed by teeth 1130, 1132 and chamber wall 1107 that may retard a leakage of fluid around oval gear 1108. Applicants have found that this example of an oval gear may reduce leakage of fluid between oval gear 1108 and chamber wall 1107 thereby increasing the accuracy of measurement of oval gear 1101 relative to oval gear 1100 of FIG. 11A. It can be appreciated that a pair of teeth on the other end of major axis 1170, as well as teeth along a major axis of the other oval gear of oval gear meter 1101 may be configured in a similar manner to reduce a leakage of fluid.

Figure 11C:
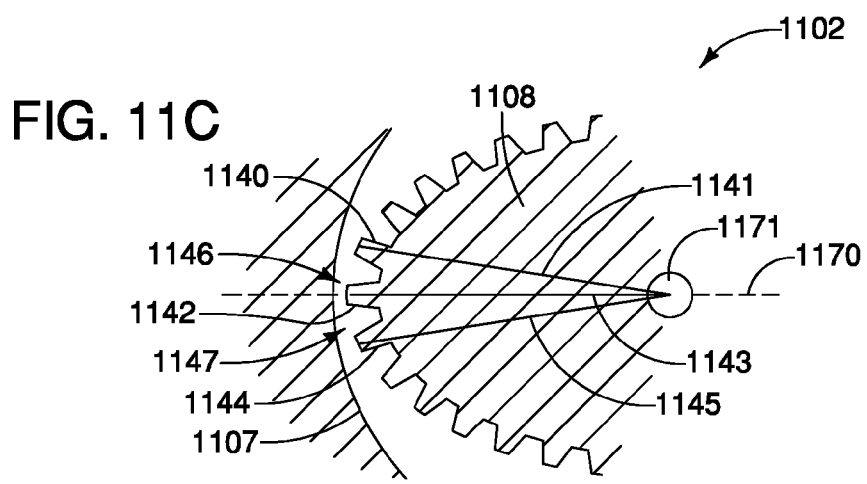

FIG. 11C shows another partial top view of an oval gear meter 1102. In this example, oval gear meter 1102 includes three teeth 1140, 1142 and 1144 positioned at an end of major axis 1170 configured to minimize a leakage of fluid around oval gear 1108 and the chamber wall. The radial distances 1141, 1143 and 1145 of teeth 1140, 1142 and 1144, respectively, to a center 1171 of the oval gear are equal. Accordingly, the gap between each tooth and chamber wall 1107 are also equal. Thus pockets of fluid 1146 and 1147 are formed by the teeth and the wall that may retard the leakage of fluid around oval gear 1108. Applicants have found that this example of an oval gear may further reduce leakage of fluid around oval gear 1108 in comparison to oval gear 1101 of FIG. 11B. It can be appreciated that teeth on the other end of major axis 1170, as well as teeth along a major axis of the other oval gear of oval gear meter 1102 may be configured in a similar manner to reduce a leakage of fluid. In one example, the configuration of oval gear meter 1102 may be achieved by taking the oval gear of oval gear meter 110 shown in FIG. 11A and shaving tooth 1120 down until the radial distance between the top of the tooth and a center 1171 of the oval gear is equal to the radially distance between the top of the teeth adjacent to tooth 1120 and the center 1171 of the oval gear. In another example, an oval gear meter may be configured such that four teeth at the ends of the major axes of the oval gears have an equally radially distance between the tops of each tooth and the center of each respective gear. In this example, three fluid pockets may be formed between the teeth and chamber wall 1107 that may further retard fluid leakage around the oval gears.

The techniques described in this disclosure may be implemented, at least in part, in hardware, software, firmware or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" may generally refer to any of the foregoing logic circuitry, alone or in combination with other logic circuitry, or any other equivalent circuitry. A unit comprising hardware may also perform one or more of the techniques of this disclosure. Such hardware, software, and firmware may be implemented within the same device or within separate devices to support the various operations and functions described in this disclosure.

The techniques described in this disclosure may also be embodied or encoded in a non-transitory computer-readable medium, such as a computer-readable storage medium, containing instructions. Instructions embedded or encoded in a computer-readable storage medium may cause a programmable processor, or other processor, to perform the method, e.g., when the instructions are executed. Non-transitory computer readable storage media may include volatile and/or non-volatile memory forms including, e.g., random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer readable media.

Various examples of the invention have been described. Although the present invention has been described in considerable detail with reference to certain disclosed embodiments, the embodiments are presented for purposes of illustration and not limitation. Other embodiments incorporating the invention are possible. One skilled in the art will appreciate that various changes, adaptations, and modifications may be made without departing from the spirit of the invention and the scope of the appended claims.

What is claimed is:

1. A system comprising:
a flow meter having a first gear intermeshing with a second gear, the intermeshing of the first gear and the second gear permitting synchronous rotation of the first gear and the second gear in response to fluid flow through the flow meter, at least one of the first gear and the second gear having a detectable area for detecting a rotational position of the first gear and the second gear;
a first non-contact sensor configured to generate a first detection signal and to sense the detectable area when the first gear and second gear are in a first range of rotational positions, the first detection signal indicative of a position of the detectable area relative to the first non-contact sensor; and
a second non-contact sensor configured to generate a second detection signal and to sense the detectable area when the first gear and second gear are in a second range of rotational positions, the first and second ranges of rotational positions being different, the second detection signal indicative of a position of the detectable area relative to the second non-contact sensor,
the first and second detection signals being associated with one of at least four distinct rotation states based on the first detection signal and the second detection signal;
the system being configured for incrementing a rotation count indicative of a number of rotations of the first and second gears when the rotation state has achieved at least one of the at least four distinct rotation states.

2. The system of claim 1, wherein the rotation count is incremented after the first and second gears complete one full rotation.

3. The system of claim 2, wherein the rotation count is incremented by a fractional amount when the first and second gears complete one full rotation.

4. The system of claim 1, wherein the at least four rotation states comprises a first rotation state and a second rotation state, wherein, in the first rotation state, the detectable area is not sensed by either one of the first non-contact sensor and the second non-contact sensor.

5. The system of claim 4, wherein, in the second rotation state, the detectable area is sensed by both the first non-contact sensor and the second non-contact sensor.

6. The system of claim 1, wherein, the first gear and the second gears reach the at least four rotation states in a sequence, the sequence being indicative of a rotational direction of the first gear and the second gear.

7. The system of claim 6, wherein the rotational count is incremented after completing the sequence of rotational states.

8. A system comprising:
a flow meter having a first gear intermeshing with a second gear so that the first gear and the second gear rotate together in response to fluid flow through the flow meter, at least one of the first gear and the second gear having a detectable area for detecting a rotational position of the first gear and the second gear;

a first non-contact sensor configured to generate a first detection signal and to sense the detectable area when the first gear and second gear are in a first range of rotational positions, the first detection signal indicative of a position of the detectable area relative to the first non-contact sensor;

a second non-contact sensor configured to generate a second detection signal and to sense the detectable area when the first gear and second gear are in a second range of rotational positions, the first and second ranges of rotational positions being different, the second detection signal indicative of a position of the detectable area relative to the second non-contact sensor; and a controller operatively connected to the first non-contact sensor and the second noncontact sensor and configured to:

define a first set of rotation state transitions and a second set of rotation state transitions, the first set of rotation state transitions corresponding to a first direction of rotation and the second set of rotation state transitions corresponding to a second direction of rotation opposite the first; and incrementally increase or decrease a rotational count when a rotation state transition is detected from the first set of rotation state transitions or the second set of rotation state transitions, respectively, the rotational count indicative of a number of rotations of the first and second gears.

9. The system of claim 8, wherein the controller is further configured to receive the first detection signal;

receive the second detection signal; and define a plurality of rotation states based on the first detection signal and the second detection signal.

10. The system of claim 9, wherein the first set of rotation state transitions and the second set of rotation state transitions each include at least four rotation states.

11. The system of claim 9, wherein the first set of rotation state transitions and the second set of rotation state transitions each include at least eight rotation states.

12. The system of claim 9, wherein the controller is configured for increasing the rotational count after completing half a rotation.

13. The system of claim 9, wherein the controller is configured for increasing the rotational count after completing one quarter of a rotation.

14. The system of claim 9, wherein the controller is further configured to determine whether the received first detection signal and the received second detection signal each correspond to an expected rotation state.

15. The system of claim 14, wherein the first gear and the second gear reach each rotation state in a sequence, the sequence being indicative of a forward rotation of the first gear and the second gear.

16. The system of claim 15, wherein the expected rotation state is indicative of a forward rotation of the first gear and the second gear.

17. The system of claim 15, wherein, when the received first detection signal and the received second detection signal each do not correspond to the expected rotation state, the controller is further configured to determine that the first gear and the second gear rotate in a backward direction, the backward direction being opposite to the forward direction.

18. The system of claim 17, wherein the controller is configured to disregard the first detection signal and the second detection signal, when the first detection signal and the second detection signal each do not correspond to the expected rotation state.

19. The system of claim 8, wherein the first detection signal and the second detection signal are identical.

20. A system comprising:

a flow meter having a housing that defines a chamber having a fluid inlet and a fluid outlet and having a first gear and a second gear installed within the chamber, the first gear intermeshing with the second gear so that the first gear and the second gear rotate together in response to fluid flow through the chamber, and at least one of the first gear and the second gear having a detectable area for detecting a rotational position of the first gear and the second gear;

a first non-contact sensor configured to generate a first detection signal and to sense the detectable area when the first gear and second gear are in a first range of rotational positions, the first detection signal indicative of a position of the detectable area relative to the first non-contact sensor;

a second non-contact sensor configured to generate a second detection signal and to sense the detectable area when the first gear and second gear are in a second range of rotational positions, the first and second ranges of rotational positions being different, the second detection signal indicative of a position of the detectable area relative to the second non-contact sensor; and a controller operatively connected to the first non-contact sensor and the second noncontact sensor and configured to:

receive the first detection signal;

receive the second detection signal;

generate an output signal indicative of a rotational position of the first and second gears based on the first detection signal and the second detection signal;

monitor the output signal over time; and increment a rotation count indicative of a number of rotations of the first and second gears based on a detected event in the output signal.

* * * * *